(No Model.)
I. COMBES.
Fruit Picker.
No. 231,765. Patented Aug. 31, 1880.
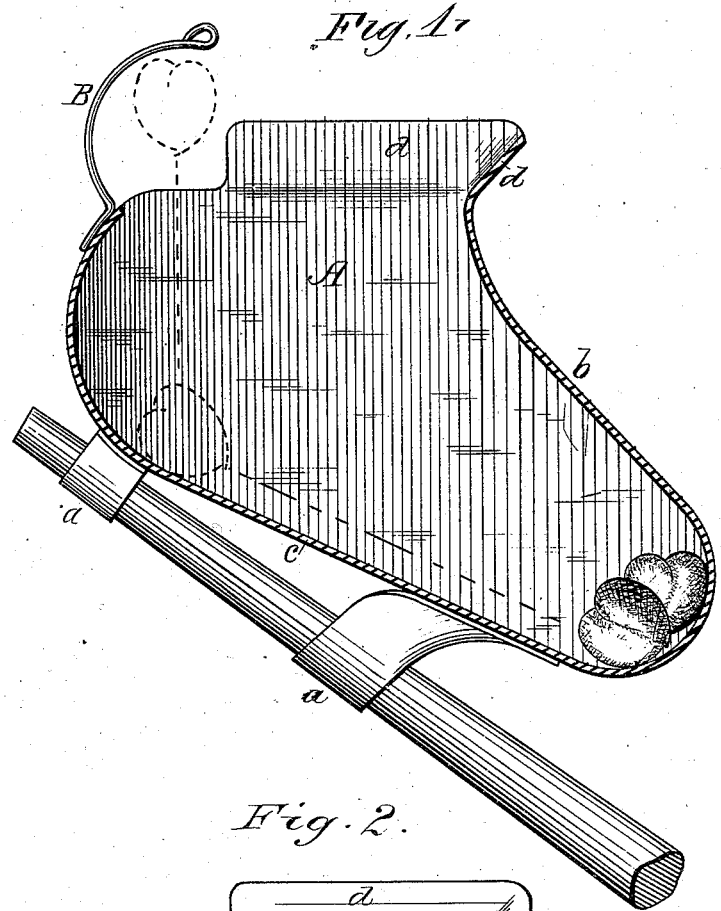
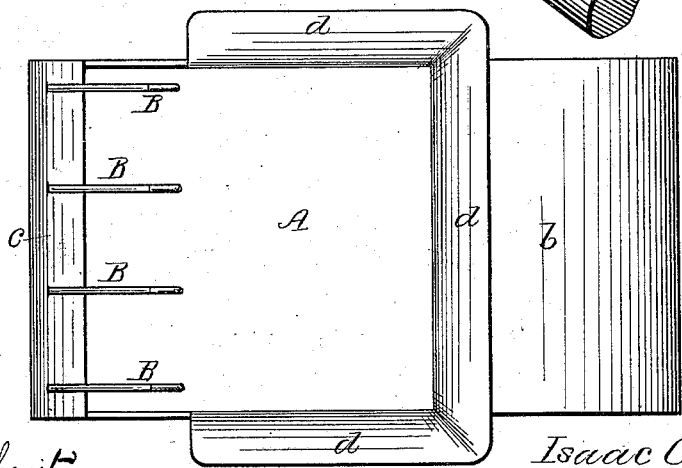
Witnesses
Nat. E. Oliphant;
Geo. R. Porter.
Inventor
Isaac Combes,
per Chas. H. Fowler.
Attorney.

UNITED STATES PATENT OFFICE.

ISAAC COMBES, OF HECKLAND, INDIANA.

FRUIT-PICKER.

SPECIFICATION forming part of Letters Patent No. 231,765, dated August 31, 1880.

Application filed July 26, 1880. (No model.)

*To all whom it may concern:*

Be it known that I, ISAAC COMBES, a citizen of the United States, residing at Heckland, in the county of Vigo and State of Indiana, have invented certain new and useful Improvements in Fruit-Pickers; and I do hereby declare that the following is a full, clear, and exact description of the same, reference being had to the annexed drawings, making a part of this specification, and to the letters and figures of reference marked thereon.

Figure 1 is a side elevation of my invention with one of the sides of the receptacle for the fruit removed, and Fig. 2 a top-plan view of the same.

The present invention has relation to certain new and useful improvements in that class of fruit-pickers in which is employed a receptacle for the fruit having secured thereto a series of fingers for introducing among the branches of the tree on which the fruit to be picked grows, so as to pick any particular pear, peach, apple, or other fruit, the same, when pulled, falling into the receptacle.

The receptacles usually employed are simply of cylindrical form, with their sides vertical, or nearly so, in the shape of a pail or bucket, they being composed of a rigid material and provided with a series of fingers for severing the fruit from the limb of the tree.

Another form of fruit-gatherer consists of a conical or tapering bag, of canvas or other like flexible material, the same being provided with means for picking the fruit, and having located within its interior an inclined diaphragm, to prevent the forcible striking of the fruit upon that in the bottom of the bag.

The purpose of the present invention is to construct a fruit-picker of simple form, with which the fruit can be picked without injury thereto by falling directly to the bottom of the receptacle, and also prevent injury to the fruit by striking against the edges or rim thereof, so that all danger of bruising or disfiguring the fruit is removed, thereby enabling the fruit to be gathered, packed, and transported, ready for the market, in a perfect and salable condition. These objects I attain by the construction and form of the receptacle, as illustrated in the drawings and hereinafter described.

In the accompanying drawings, A represents the receptacle, of any suitable material, preferably of sheet metal, having secured to its back rings or bands $a$, for connecting it to the end of a pole or handle of the desired length, so as to enable the person using the picker to handle it with facility in introducing it among the branches of the tree.

The receptacle A is provided with a series of curved fingers, B, preferably of wire, which are passed between the fruit desired to be picked and the branches of the tree on which it grows until the fruit is within their grasp, when a gentle pull is given, causing the fruit to be disengaged from the branches and drop into the receptacle. Now, were this vessel of the ordinary kind—that is to say, with vertical sides—the fruit would fall in a straight course, striking the bottom, which would tend to bruise it by its weight, and if there were any fruit at the bottom of the receptacle it would likewise become injured. To avoid this the receptacle A is tapering in form, having inclined front $b$ and back $c$, the bottom of the receptacle being much smaller than the upper part. It will thus be seen that when the peach, pear, or other fruit is picked it will strike against the upper end of the inclined back $c$, as shown in dotted lines, and roll down the same to the bottom of the receptacle, thus breaking its fall and preventing its becoming bruised or otherwise injured by a direct fall to the bottom.

The upper edge or rim of the receptacle A is provided with flaring guards $d$, to prevent the fruit, when severed from the branches, from striking against the bare edges or rim of the receptacle and cutting or bruising them.

It will therefore be seen that every provision is made to prevent injury to the fruit in gathering it, thus enabling the process of picking to be performed with comparatively little or no danger to the marketable value of said fruit.

Having now fully described my invention, what I claim as new, and desire to secure by Letters Patent, is—

A fruit-picker consisting of the tapering receptacle A, constructed, as described, with inclined back $c$, flaring guards $d$, and curved fingers B, substantially as and for the purpose specified.

In testimony that I claim the above I have hereunto subscribed my name in the presence of two witnesses.

ISAAC COMBES.

Witnesses:
JOHN S. LAW,
WALTER HALL.